US009749438B1

United States Patent
Wen et al.

(10) Patent No.: US 9,749,438 B1
(45) Date of Patent: Aug. 29, 2017

(54) PROVIDING A CONTENT ITEM FOR PRESENTATION WITH MULTIPLE APPLICATIONS

(71) Applicant: Google Inc., Mountain View, CA (US)

(72) Inventors: Kai Wen, Fremont, CA (US); Ramesh R. Sarukkai, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 365 days.

(21) Appl. No.: 14/516,130

(22) Filed: Oct. 16, 2014

(51) Int. Cl.
*G06F 15/16* (2006.01)
*H04L 29/08* (2006.01)

(52) U.S. Cl.
CPC ........ *H04L 67/2847* (2013.01); *H04L 67/303* (2013.01)

(58) Field of Classification Search
CPC .................................................... H04L 67/303
USPC ......................................................... 709/203
See application file for complete search history.

(56) References Cited

U.S. PATENT DOCUMENTS

| 8,275,663 | B2 | 9/2012 | Rochford et al. |
| 8,423,003 | B2 | 4/2013 | Sarukkai et al. |
| 2007/0038567 | A1* | 2/2007 | Allaire ............... G06Q 30/0239 705/50 |
| 2007/0271139 | A1 | 11/2007 | Fiorini |
| 2008/0319650 | A1 | 12/2008 | Aaltonen et al. |
| 2011/0258049 | A1* | 10/2011 | Ramer .............. G06F 17/30867 705/14.66 |
| 2014/0214545 | A1 | 7/2014 | Zhang et al. |

\* cited by examiner

*Primary Examiner* — Adnan Mirza
(74) *Attorney, Agent, or Firm* — Foley and Lardner LLP; John D. Lanza

(57) ABSTRACT

Methods, systems, and computer programs encoded on a computer storage medium, for distributing content are disclosed, including receiving a request for a content item to be stored for presentation with content of a first application when a client device is offline; in response, generating and transmitting data that causes the client device to store the content item for presentation with the content of the first application when the client device is offline; determining that a second application is installed; determining that the content item is able to be presented with content of the second application when the client device is offline; and in response, generating and transmitting analytics instructions that cause the client device to detect presentation of the content item with each of the first application and the second application and submit data specifying whether the content item was presented with the first application or the second application.

20 Claims, 4 Drawing Sheets

PROVIDING A CONTENT ITEM FOR PRESENTATION WITH MULTIPLE APPLICATIONS

BACKGROUND

This specification relates to providing a content item with presentation with multiple applications, and specifically, multiple applications of a client device when the client device is offline.

The Internet provides access to a wide variety of resources, such as video and/or audio files, as well as web pages for particular subjects or that present particular news articles accessible over the Internet. Applications, web pages, and search results pages can include slots in which advertisements (or other content items) can be presented. For example, advertisements considered relevant to an application can be selected for presentation with the application. Advertisements or other content items that are presented in the slots are selected for presentation by a content distribution system that can perform an auction as part of the selection process.

SUMMARY

In general, one innovative aspect of the subject matter described in this specification can be embodied in methods that include the actions of receiving, by one or more data processing apparatus, a request submitted by a client device for a content item to be stored for presentation with offline content of a first application when the client device is offline; in response to receiving the request, generating and transmitting data that causes the client device to store the content item for presentation with the offline content of the first application when the client device is offline; determining, by the one or more data processing apparatus, that a second application is installed on the client device; determining that the content item is able to be presented with offline content of the second application when the client device is offline; and in response to determining that the content item is able to be presented with the second application, generating and transmitting analytics instructions that cause the client device to detect presentation of the content item with each of the first application and the second application and submit data specifying whether the content item was presented with the first application or the second application.

Other embodiments of these aspects including corresponding systems, apparatus, and computer programs, configured to perform the actions of the methods, encoded on computer storage devices.

These and other embodiments can each optionally including one or more of the follow features. For example, selecting the particular content item based on i) the offline content of the first application and ii) profile data, wherein the profile data includes data specifying activities performed at the client device. Transmitting data that notifies the client device that the particular content item is able to be presented with the offline content of the second application when the client device is offline. Determining that the second application is installed on the client device further includes receiving, by the one or more data processing apparatus, a call submitted by the client device to determine whether the particular content item is able to be presented with the offline content of the second application when the client device is offline, the call including i) data associated with the particular content item and ii) data associated with the second application. Generating the analytics instructions includes generating analytics instructions that cause the user device to provide billing identification information associated with the i) particular content item and ii) the second application in response to user presentation of the particular content item with the second application. Determining that the particular content item is unable to be presented with a third application that is installed on the client device; and in response to determining that the particular content item is unable to be presented with the third application, providing, to the client device, incompatibility data specifying that the particular content item is unable to be presented with the third application.

For example, determining that the particular content item is unable to be presented with the third application that is installed on the client device further includes determining that the particular content item is in a file format that is not supported by the third application. After providing the incompatibility data to the client device, receiving an additional request for an additional content item to be presented with the third application when the client device is offline. Selecting the particular content item based on a categorization of the first application. Determining that the content item is able to be presented with offline content of the second application when the client device is offline further includes comparing one or more first parameters associated with the content item with one or more second parameters associated with the second application; determining that at least one of the first parameters and one of the second parameters have a similarity greater than a threshold; and in response to determining that at least one of the first parameters and one of the second parameters have a similarity greater than a threshold, determining that the content item is able to be presented with the offline content of the second application when the client device is offline.

Particular embodiments of the subject matter described in this specification can be implemented so as to realize one or more of the following advantages. For example, consumption of a client device memory by an advertisement can be reduced using the features described in this document, thereby enabling the client device to store other files or data. Loading time of an advertisement presented on a client device can be reduced using features disclosed by this document, thereby enabling the client device to more quickly provide access to documents or files. Integration with some advertisement systems without substantial change to bidding/targeting models is realized. Features disclosed by this document can improve various technologies such as information retrieval technologies by enabling a computing device to more quickly identify and/or present information to a user. Features disclosed by this document can also improve online data transfer technologies, by reducing the amount of data required for a computing device to provide and/or display information.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
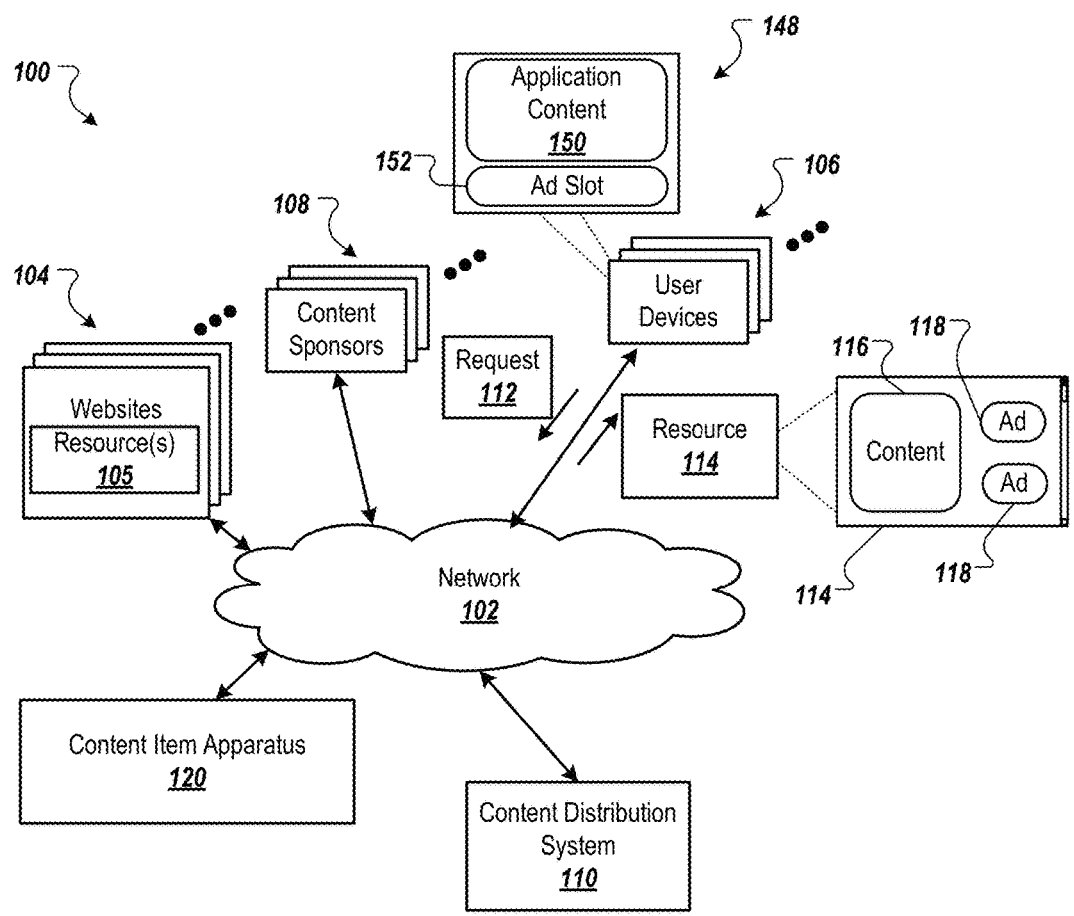
FIG. 1 is a block diagram of an example environment in which a content distribution system distributes content items to user devices.

In general, implementations of the present disclosure are directed to providing a content item for presentation with multiple applications. In some implementations, a mobile computing device provides a request for a content item, e.g., an advertisement, that will be later presented with a first application when the mobile computing device is offline. A content item apparatus receives the request, and in response, generates (and transmits) data including instructions that cause the mobile computing device to store the content item for presentation with offline content of the first application at a later time when the mobile computing device is offline.

The content item apparatus can determine that a second application is also installed on the mobile computing device and that the aforementioned content item is able to be presented with the second application when the mobile computing device is offline. For example, the content item apparatus can determine that the second application is capable of processing and/or displaying content in the same file format as the content item. Additionally, the content item apparatus generates and provides to the mobile computing device analytics instructions that cause the mobile computing device to detect presentation of the content item with each of the first and/or second applications. The mobile computing device receives the analytics instructions, and further submits data to the content item apparatus specifying whether the content item was presented with the first application or the second application.

For purposes of example, the description that follows refers to advertisements as the content items that are distributed to user devices and advertisers as the content sponsors that provide the advertisements. The description is also applicable to distribution of other types of content items (e.g., audio files, video files, or other content) that are provided to user devices.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content sender that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects websites 104, user devices 106, content sponsors 108, and a content distribution system 110. The example environment 100 may include many different websites 104, user devices 106, and content sponsors 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

Units of content that are presented in (or with) resources are referred to as content items, and an individual content item can be stored in a single file or set of files independent of the resource. As discussed above, an advertisement or a portion of an advertisement is a type of content item that can be provided to user devices.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a web page from a social network, or another resource 105. The data representing the requested resource 114 can include data that causes presentation of resource content 116 at the user device 106. The data representing the requested resource 114 can also include data specifying one or more content item slots 118. A content item slot is a portion of the resource (e.g., a portion of a web page) or a portion of a user display (e.g., a presentation location of another window or in a slot of a web page) in which one or more content items, such as advertisements, can be presented. A content items slot 118 can also be referred to as an advertisement slot, but any type of content (e.g., content items other than advertisements) can be presented in the content item slot 118.

When a resource 105 is requested by a user device 106, execution of code associated with a content item slot 118 in the resource initiates a request for a content item to populate the slot. The request can include characteristics of the slots that are defined for the requested resource 114. For example, a reference (e.g., URL) to the requested resource 114 for which the content item slot 118 is defined, a size of the content item slot, a maximum number of presentation positions (or content items) that can be included in the content item slot 118, and/or media types that are eligible for presentation in the content item slot 118 can be provided to the Content Distribution System 110. The requests can also include other information, such as information that the user has provided (e.g., demographic information), geographic information indicating a state or region from which the request was submitted, or other information that provides context for the environment in which the content item will be displayed (e.g., a type of device at which the content item will be displayed, such as a mobile device or tablet device).

The user device 106 is also capable of executing various applications that upon execution present application content. For example, as illustrated, the user device 106 includes an application 148 that presents application content 150. The various applications can include, for example, gaming apps, home decorating apps, productivity apps (e.g., word processing, presentation, or spreadsheet apps), personal finance apps, and many other types of apps. Many applications can be used in an "offline" mode, which does not require the application to have a network connection in order for the application to present the application content and/or data.

Some applications generate revenue by presenting advertisements (or other sponsored content) with the application content. For example, the application 148 can include a content item slot 152, similar to the content item slot 118 mentioned above. When the user device 106 is connected to a network, the advertisements (or other sponsored content) presented with the application and the content item slots can be obtained on demand, for example, by the application initiating a content item request in a manner similar to that by which resources 105 obtain advertisements.

However, when the application content is presented while the user device 106 is not connected to a network (or the application is otherwise unable to request advertisements in a manner similar to that described above, e.g., because data transfer across a mobile network has been disabled in the user device 106), advertisements that are presented with the application content may be limited to those stored on the user device 106. As the number of applications attempting to store advertisements for offline presentation increases (e.g., when the user device 106 is not connected to a network), the amount of user device memory required to store the advertisements will increase, which can reduce the amount of data available for other files (e.g., other applications) and/or negatively impact the response time of the user device 106. One way of efficiently utilizing the resources of the user device 106 is to enable multiple applications to utilize the same stored advertisements, but not all applications have the same capabilities or ability to present the same types of content.

The environment further includes a content item apparatus 120 that provides a content item for presentation with multiple applications and enables the user device 106 to provide feedback regarding which, if any, of the applications presented the content item. For example, as described in more detail below, the content item apparatus 120 can determine that a particular (or given) content item, e.g., an advertisement, can be presented by each of a first application and a second application of the user device 106 when the user device 106 is offline. In response to this determination, the content item apparatus 120 can make the advertisement available for presentation with either of the first application or the second application. Additionally, the content item apparatus 120 generates and provides analytics instructions to the user device 106. The analytics instructions enable (or cause) the user device 106 to detect presentation of the particular content item with either the first application or the second application, and provide feedback (e.g., analytics data) specifying which of the first application and/or the second application presented the content item, as described further below.

Figure 2:
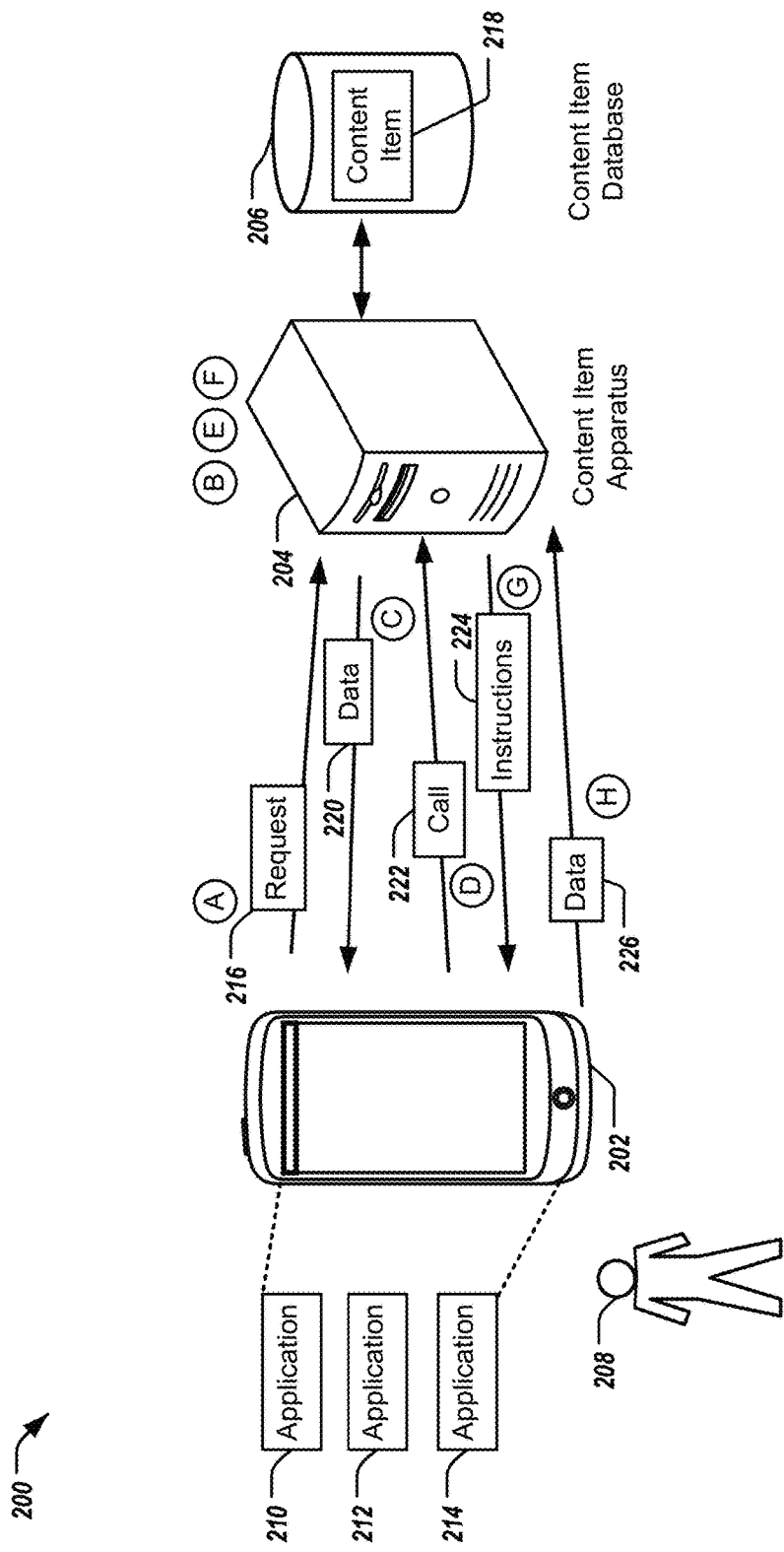
FIG. 2 is a block diagram of an example system for providing a content item for presentation with multiple applications.

FIG. 2 is a block diagram illustrating a system 200 for providing a content item for presentation with multiple applications. The system 200 includes a mobile computing device 202, a content item apparatus 204, and a content item database 206. In some examples, the mobile computing device 202 is a client computing device and can include a portable computer, a smartphone, a tablet-computing device, or a wearable computing device. The mobile computing device 202 is associated with a user 208. The mobile computing device 202 is in communication with the content item apparatus 204, e.g., over one or more networks. The content item apparatus 204 can include the content apparatus 120 of FIG. 1.

The mobile computing device 202 includes, or provides access to, a first application 210, a second application 212, and a third application 214 that are executable by the mobile computing device 202. In some examples, the applications 210, 212, 214 are individual executable software modules that provide an application interface through a graphical user interface (GUI) of the mobile computing device 202 for interaction by the user 208. For example, the applications 210, 212, 214 can include a social media application, a banking application, or a gaming application. The mobile computing device 202 can include, or provide access to, any number of applications.

In some implementations, the content item apparatus 204 receives a request 216 that is provided by the mobile computing device 202, e.g., over one or more networks, at stage (A). Specifically, the mobile computing device 202 generates the request 216 for a content item that is to be stored by the mobile computing device 202 for presentation with content of the first application 210 at a later time when the mobile computing device 202 is offline. That is, when the mobile computing device 202 is offline, the mobile computing device 202 has limited or no data connectivity, e.g., through a cellular connection, wireless internet connection (Wi-Fi) connection, or other type of data connection.

Assume for purposes of example that when the mobile computing device 202 is offline, the first application 210 is executable by the mobile computing device 202, e.g., the user 208 is able to interact with the first application 210 (by the GUI or other methods). In this example, while the mobile computing device 202 is online, the mobile computing device can obtain one or more content items presentable with the first application 210 when executed in the offline mode. To that end and while online (e.g., having a data connection), the mobile computing device 202 generates the request 216 for a content item that will be presented with the first application 210 at a later time when the mobile computing device 202 is offline. In some examples, the content item includes an advertisement.

In some examples, the request 216 includes, in addition to instructions for a request for the content item, data (e.g., metadata) that is associated with the first application 210. For example, the data that is associated with the first application 210 can include a name of the first application 210, a developer of the first application 210, a category of the first application 210, or other identifying information that is associated with the first application 210.

In some examples, the request 216 includes, in addition to instructions for a request for the content item, profile data associated with the user 208. For example, the profile data can include any demographic criteria associated with the user 208. In some examples, the user profile data is obtained from publicly available social networking profile(s) associated with the user 208. In some examples, the profile data can be generalized. In some examples, the user 208 may have control over how information is collected about the user 208 and used by the content item apparatus 204.

For example, the first application 210 includes a gaming application that the user 208 can interact with when the mobile computing device 202 is offline. That is, the user 208 is able to "play" the game of the first application 210. To that end, the mobile computing device 202 generates the request 216 that is provided to the content item apparatus 204 (and received by the content item apparatus 204) for a content item that is presented with the game of the first application 210 when the mobile computing device 202 is offline.

In some implementations, in response to receiving the request 216, the content item apparatus 204 generates data that causes the mobile computing device 202 to store the content item, at stage (B). Specifically, the content item apparatus 204 generates the data that is presented with the offline content of the first application 210 when the mobile computing device 202 is offline, and provides the data to the mobile device 202 for storage until the content item is requested (e.g., by the first application 210) for presentation.

In some examples, the content item apparatus 204 is in communication with the content item database 206, e.g., over one or more networks. The content item database 206 stores, or provides access to, one or more content items 218. The content items 218 can include advertisements, including image-based advertisements, video-based advertisements, and audio-based advertisements.

The content item apparatus 204 can select one or more of the content items 218 stored by the content item database 206. In some examples, based on the selected content item 218, the content item apparatus 204 generates data associated with the selected content item 218 such that when the data is provided to the mobile computing device 202, the mobile computing device 202 stores the selected content item 218. For example, for the request 216 for a content item that is to be presented with the first application 210, e.g., a gaming application, the content item apparatus 204 selects a content item 218 that includes an advertisement for a related gaming application from the content item database 206.

In some examples, the content item apparatus 204 selects the one or more content items 218 based on i) the content of the first application 210 and/or ii) profile data associated with the user 208. For example, as mentioned above, the content item apparatus 204 receives data that is associated with the first application 210, and profile data associated with the user 208 and uses that data to select the one or more content items.

The content item apparatus 204 can appropriately processes the data received that is associated with the first application 210, and the profile data associated with the user 208 to select the one or more content items 218. For example, the data received can include a name of the first application 210 and the profile data can include one or more interests associated with the user 208 (e.g., as provided in a publicly available social network profile or inferred based on other information such as contextual information related to the first application 210).

The content item apparatus 204 selects one or more of the content items 218 based on the name of the first application 210, and the interests associated with the user 208. For example, the content item apparatus 204 selects a content item 218 that includes an advertisement for a related gaming application (e.g., Chess gaming application) based on the name of the first application 210 (e.g., Checkers) and an identified interest of the user 208 (e.g., board games). The content item apparatus 204 can also use other parameters associated with the content of the first application 210 and/or the profile data associated with the user 208 to select content items.

In some examples, the content item apparatus 204 selects the one or more content items 218 based on the categorization of the first application 210. For example, the category of the first application 210 can include a gaming category (e.g., classic board games). Thus, the content item apparatus 204 selects the one or more content items 218 based on the gaming category. That is, the content item apparatus 204 selects the one or more content items 218 that are associated with the gaming category. For examples, the content item apparatus 204 selects a content item 218 that includes an advertisement for a related gaming application. In some examples, the content item apparatus 204 selects the one or more content items 218 based on the content of the first application 210. In some examples, the content item apparatus 204 selects the one or more content items 218 based on the profile data associated with the user 208.

In some examples, the profile data includes data specifying activities performed at the mobile computing device 202. For example, the data can specify, at least, interactions with the applications 210, 212, 214. Such interactions (e.g., user input) can include interactions through the GUI of the mobile computing device 202 with the applications 210, 212, 214, as well as interactions through voice-commands with the applications 210, 212, 214, and other user-input related activities with the applications 210, 212, 214. In some examples, the data specifying the activities performed at the mobile computing device 202 can include which of the applications 210, 212, 214 the user 208 interacted with, how many of the applications 210, 212, 214 were interacted with, a duration of time the interaction with each application 210, 212, 214, and a sequence of interaction with each of the applications 210, 212, 214.

In some implementations, the content item apparatus 204 transmits data 220 that causes the mobile computing device 202 to store the content item 218, at stage (C). Specifically, the content item apparatus 204 transmits the data 220 representing the content item 218 that will be presented with the offline content of the first application 210 when the mobile computing device 202 is offline. The content item apparatus 204 transmits the data 220 over one or more networks when the mobile computing device 202 is online (e.g., having a data connection). In some examples, the data 220 that causes the mobile computing device 202 to store the content item 218 can include instructions for the mobile computing device 202 to store the content item 218, metadata associated with the content item 218, and/or the content item 218. In some examples, the content item apparatus 204 transmits the data 220 to the mobile computing device 202 in response to the generating the data 220, and thus, in response to receiving the request 216. In some examples, the content item apparatus 204 transmits the data 220 to the mobile computing device 202 subsequent to generating the data 220.

In some implementations, the content item apparatus 204 determines that the second application 212 is installed on the mobile computing device 202. In some examples, the determination that the second application 212 is installed on the mobile computing device 202 can be made based on the content item apparatus receiving a call 222 from the mobile computing device 202, at stage (D). In some examples, the call 222 includes data that is associated with i) the second application 212 and/or ii) data associated with the content item 218. Specifically, the mobile computing device 202 generates the call 222 and provides the call 222 to the content item apparatus 204 to determine whether the content item 218 is able to be presented with the content of the second application 212 when the mobile computing device 202 is offline.

For example, the second application 212 is an educational-gaming application. The mobile computing device 202 generates the call 222 and provides the call 222 to the content item apparatus 204 to determine whether the content item 218 that includes an advertisement for a gaming application (based on, at least, the first application 210) is able to be presented with content of the second application 212 that includes an educational-gaming application.

In some examples, the call 222 includes data that is associated with the second application 212. Thus, in response to the call 222, the content item apparatus 204 determines which content items, if any, were previously provided to the mobile computing device 202, e.g., prior to receiving the call 222. For example, the content item apparatus 204 determines that the content item 218 was previously provided to the mobile computing device 202, e.g., in response to request 216 that was associated with the first application 210. Thus, the content item apparatus 204 is able to determine whether the content item 218 is able to be presented with the content of the second application 212 when the mobile computing device is offline based on determining that the content item 218 was previously provided to the mobile computing device 202.

In some implementations, the content item apparatus 204 determines that the content item 218 is able to be presented with the content of the second application 212 when the mobile computing device 202 is offline, at stage (E). In some examples, in response to receiving the call 222 from the mobile computing device 202, the content item apparatus 204 determines that the content item 218 is able to be presented with the content of the second application 212. That is, the content item apparatus 204 determines that the content item 218, as stored by the mobile computing device 202, is compatible with the content of (and/or executable by) the second application 212 when the mobile computing device 202 is offline. Thus, when the content item 218 is requested by the second application 212, the mobile computing device 202 presents the content items 218 with the content of the second application 212.

Additionally, in some examples, as a result of the content item 218 being previously stored by the mobile computing device 202, storage of an additional content item for presentation with the content of the second application 212 is not needed (however, in some examples, the mobile computing device 202 may also provide storage of additional content items). That is, the same content item 218 is able to be presented with both the content of the first application 210 and the content of the second application 212, and storage of an additional content item for presentation with the content of the second application 212 is not needed. As a result, consumption of memory of the mobile computing device 202 is reduced, thereby enabling the mobile computing device 202 to store other files or data. Additionally, loading time of the content item 218, e.g., for presentation with the second application 212, is reduced, thereby enabling the mobile computing device 202 to more quickly provide access to documents or files.

In some examples, the content item apparatus 204 determines that the content item 218 is compatible with the content of the second application 212 by comparing one or more parameters associated with the content item 218 with one or more parameters associated with the second application 212. To that end, when one or more parameters are similar (e.g., greater than a similarity threshold), the content item apparatus 204 determines that the content item 218 is able to be presented with the content of the second application 212.

In some examples, when the content item apparatus 204 determines a quantity of the parameters associated with the content item 218 that are similar with one or more parameters associated with the second application 212 is greater than a threshold number, the content item apparatus 204 determines that the content item 218 is able to be presented with the content of the second application 212. The parameters can include, for example, category (of the content item 218 and the second application 212), name (of the content item 218 and the second application 212), developer (of the second application 212) and content item owner (of the content item 218) as well as other related parameters.

In a particular example, the content item apparatus 204 may determine that the content item 218 that includes an advertisement for a gaming application is able to be presented with the content of the second application 212 including an educational-gaming application when the mobile computing device 202 is offline. This determination can be based on at least one parameter of the second application 212 being similar to (e.g., greater than a similarity threshold) a corresponding parameter of the content item 218. For example, the content item apparatus 204 may determine that the category of the second application (educational-gaming) and the category of the content item 218 (gaming) are sufficiently similar (e.g., similarity greater than a similarity threshold) such that the advertisement is eligible for presentation with each of the applications. Based on this determination, the content item apparatus 204 determines that the content item 218 that includes an advertisement for a gaming application is able to be presented with the content of the second application 212 that includes an educational-gaming application when the mobile computing device 202 is offline.

In some implementations, in response to determining that the content item 218 is able to be presented with the second application 212, the content item apparatus 204 generates analytics instructions 224, at stage (F). In some examples, the analytics instructions 224 includes instructions that cause the mobile computing device 202 to detect presentation of the content item 218 with either of the first application 210 and/or the second application 212. Specifically, the mobile computing device 202 can determine that the content item 218 was presented in the GUI of the mobile computing device 202 during execution of the first application 210 and/or execution of the second application 212 when the mobile computing device 202 is offline.

The analytics instructions 224 can also include instructions that cause the mobile computing device 202 to provide data to the content item apparatus 204 specifying whether the content item 218 was presented with the first application 210 or the second application 212. For example, subsequent to detecting presentation of the content item 218 with each of the first application 210 and/or the second application 212, the analytics instructions 224 can cause the mobile computing device 202 to transmit data to the content item apparatus 204, e.g., over one or more networks, specifying whether the content item 218 was presented with the first application 210 and/or the second application 212. The analytics instructions 224 can be transmitted by the mobile computing device 202 when the mobile computing device 202 is online.

Additionally, in some examples, the analytics instructions 224 include instructions notifying the mobile computing device 202 that the content item 218 is able to be presented with the content of the second application 212, e.g., when the mobile computing device 202 is offline. Thus, the mobile computing device 202 is able to utilize the content item 218 in conjunction with the second application 212 when presenting the content of the second application 212 when the mobile computing device 202 is offline.

In some examples, generating the analytics instructions 224 includes the content item apparatus 204 generating instructions that cause the mobile computing device 202 to provide billing identification information associated with the i) the content item 218 and ii) the first application 210 or the second application 212 in response to presentation of the content item 218 with the first application 210 or the second application 212. The billing identification information can identify the content item 218 that is presented by the mobile computing device 202 and the application associated with the presentation of the content item 218, e.g., the first application 210 and/or the second application 212. For example, the content item apparatus 204 generates the analytics instructions 224 that cause the mobile computing device 202 to provide billing identification information associated with the i) the content item 218 that includes an advertisement for a gaming application and ii) the second application 212 of an educational-gaming application.

In some examples, the content item apparatus 204 generates the analytics instructions 224 in response to receiving the request 216, e.g., at stage A. Specifically, in response to receiving the request 216, the content item apparatus 204 generates the analytics instructions 224 that cause the mobile computing device 202 to detect presentation of the content item 218 with the first application 210 and submit data specifying that the content item 218 was presented with the first application 210.

In some implementations, the content item apparatus 204 transmits the analytics instructions 224 to the mobile computing device 202, at stage (G). Specifically, the content item apparatus 204 transmits the analytics instructions 224 to the mobile computing device 202, e.g., over one or more networks, when the mobile computing device 202 is online, e.g., prior to the mobile computing device 202 becoming offline. In some examples, the content item apparatus 204 transmits the analytics instructions 224 in response to determining that the content item 218 is able to be presented with the second application 212. In some examples, the content item apparatus 204 transmits the analytics instructions 224 to the mobile computing device 202 that includes instructions that cause the mobile computing device 202 to detect presentation of the content item 218 with each of the first application 210 and the second application 212 and provide data to the content item apparatus 204 specifying whether the content item 218 was presented with the first application 210 or the second application 212.

In some examples, the content item apparatus 204 transmits the analytics instructions 224 to the mobile computing device 202 in response to receiving the request 214. In some examples, the analytics instructions 224 include instructions that cause the mobile computing device 202 to detect presentation of the content item 218 with the first application 210 and provide data to the content item apparatus 204 specifying the content item 218 was presented with the first application 210.

In some implementations, the content item apparatus 204 receives the data 226 from the mobile computing device 202, at stage (H). The content item apparatus 204 can receive the data 226 from the mobile computing device 202, e.g., over one or more networks. In some examples, the content item apparatus 204 receives the data 226 from the mobile computing device 202 in response to a request provided by the content item apparatus 204 to the mobile computing device 202 for the data 226. In some examples, the content item apparatus 204 receives the data 226 from the mobile computing device 202 automatically, e.g., periodically, after the mobile computing device generates the data 226.

In some implementations, the content item apparatus 204 receives an additional call from the mobile computing device 202 to determine whether the content item 218 is able to be presented with content of the third application 214 when the mobile computing device 202 is offline. Specifically, the additional call includes data that is associated with i) the third application 214 and ii) data associated with the content item 218. The mobile computing device 202 generates the additional call and provides the additional call to the content item apparatus 204 to determine whether the content item 218 is able to be presented with the content of the third application 214 when the mobile computing device 202 is offline.

Assume, for purposes of example, that the third application 214 is a banking application. In this example, the mobile computing device 202 can generate the additional call and provide the additional call to the content item apparatus 204 to determine whether the content item 218 is able to be presented with content of the third application 214 that includes a banking application. In this example, the content item apparatus 204 may determine that the content item 218 is unable (or ineligible) to be presented with the content of the third application 214. That is, the content item apparatus 204 may determine that the content item 218, as stored by the mobile computing device 202, is incompatible with the content of the third application 214 when the mobile computing device 202 is offline, or that the content item 218 is in a file format that is not supported by the third application 214.

In some examples, the content item apparatus 204 determines that the content item 218 is incompatible with the content of the third application 214 by comparing one or more parameters associated with the content item 218 with one or more parameters associated with the third application 214. To that end, when one or more parameters are not sufficiently similar (e.g., have less than a specified similarity threshold), the content item apparatus 204 determines that the content item 218 is unable (or not eligible) to be presented with the content of the third application 214.

For example, the content item apparatus 204 may determine that the content item 218 that includes an advertisement for a gaming application is unable to be presented with the content of the third application 214 including a banking application when the mobile computing device 202 is offline. In this example, the determination that the content item 218 is unable to be presented with the third application may be based on a determination by the content item apparatus 204 that at least one parameter of the third application 214 is not sufficiently similar to (e.g., has less than a specified level of similarity to) a corresponding parameter of the content item 218. For example, the content item apparatus 204 may determine that the category of the third application 214 (banking application) and the category of the content item 218 (gaming) are not similar (e.g., less than a specified similarity threshold). Thus, the content item apparatus 204 determines that the content item 218 that includes an advertisement for a gaming application is unable to be presented with the content of the third application 214 that includes a banking application when the mobile computing device 202 is offline.

In some examples, in response to determining that the content item 218 is unable to be presented with the third application 214, the content item apparatus 204 provides to the mobile computing device 202 incompatibility data that specifies that the content item 218 is unable to be presented with the third application 214. Specifically, the content item apparatus 204 can transmit the incompatibility data to the mobile computing device 202 when the mobile computing device 202 is online, e.g., over one or more networks.

In some examples, after providing the incompatibility data to the mobile computing device 202, the content item apparatus 202 receives an additional request for an additional content item from the mobile computing device 202, e.g., over one or more networks. Specifically, the mobile computing device 202 generates the additional request for an additional content item for presentation with content of the third application 214 when the mobile computing device 202 is offline. For example, the third application 214 includes a banking application that the user 208 is able to interact with when the mobile computing device 202 is offline. The mobile computing device 202 generates the additional request that is provided to the content item apparatus 204 (and received by the content item apparatus 204) for the additional content item that is presented with the third application 214 when the mobile computing device 202 is offline.

Figure 3:
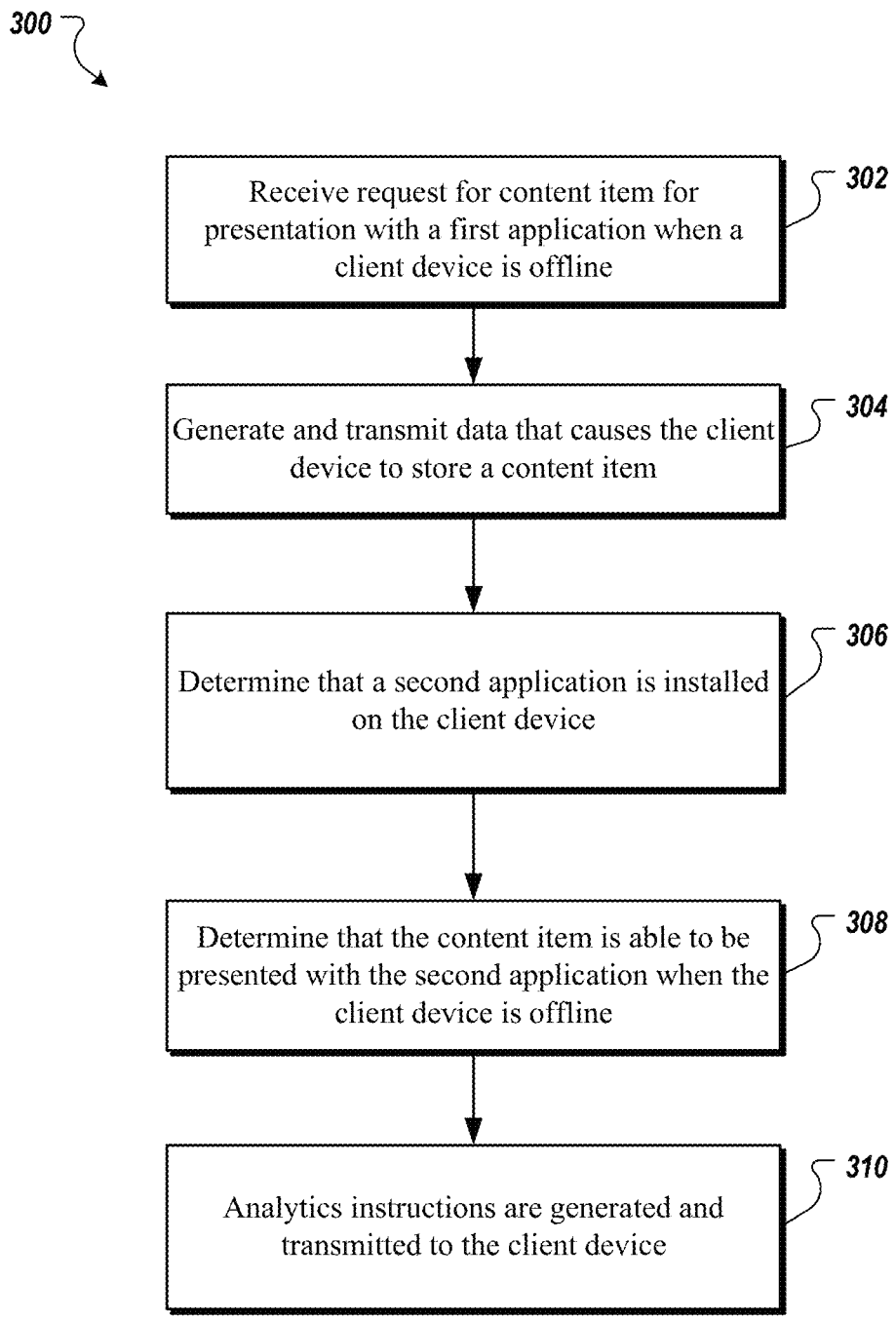
FIG. 3 is a flow chart for providing a content item for presentation with multiple applications.

FIG. 3 is a flow chart of an example process 300 for providing a content item for presentation with multiple applications. The process 300 can be performed, for example, by the mobile computing device 202, the content item apparatus 204, or another data processing apparatus. The process 300 can also be implemented as instructions stored on computer storage medium, and execution of the instructions by one or more data processing apparatus cause the one or more data processing apparatus to perform some or all of the operations of the process 300.

A request is received (302). In some implementations, the request is submitted by a client device for a content item to be stored for presentation with content of a first application when the client device is offline. For example, with reference to FIG. 2, the content item apparatus 204 receives the request 216 from the mobile computing device 202. The request 216 is for a content item, e.g., content item 218, to be stored for presentation with content of the first application 210 with the mobile computing device 202 is offline.

Data is generated and transmitted that causes the client device to store the content item (304). In some implementations, the data is generated and transmitted in response to receiving the request. For example, with reference to FIG. 2, the content item apparatus 204 generates the data 220 and transmits the data 220 to the mobile computing device 202. The data 220 causes the mobile computing device 202 to store the content item 218 for presentation with the offline content of the first application 210 when the mobile computing device 202 is offline.

A second application is determined to be installed on the client device (306). For example, with reference to FIG. 2, the content item apparatus 204 determines that the second application 212 is installed on the mobile computing device 202. In some examples, the content item apparatus 204 determines that the second application 212 is installed on the mobile computing device 202 by receiving a call 222 from the mobile computing device 202.

The content item is determined to be able to be presented with the content of the second application when the client device is offline (308). For example, with reference to FIG. 2, the content item apparatus 204 determines that the content item 218 is able to be presented with the content of the second application 212 when the mobile computing device 202 is offline.

Analytics instructions are generated and transmitted (310). In some implementations, the analytics instructions are generated and transmitted in response to determining that the content item is able to be presented with the second application. The analytics instructions cause the client device to detect presentation of the content item with each of the first application and the second application and submit data specifying whether the content item was presented with the first application or the second application. For example, with reference to FIG. 2, the content item apparatus 204 generates the analytics instructions 224 and transmits the analytics instructions to the mobile computing device 202. The analytics instructions 224 cause the mobile computing device 202 to detect presentation of the content item 218 with each of the first application 210 and the second application 212 and submit data 226 specifying whether the content item 218 was presented with the first application 210 or the second application 212.

Figure 4:
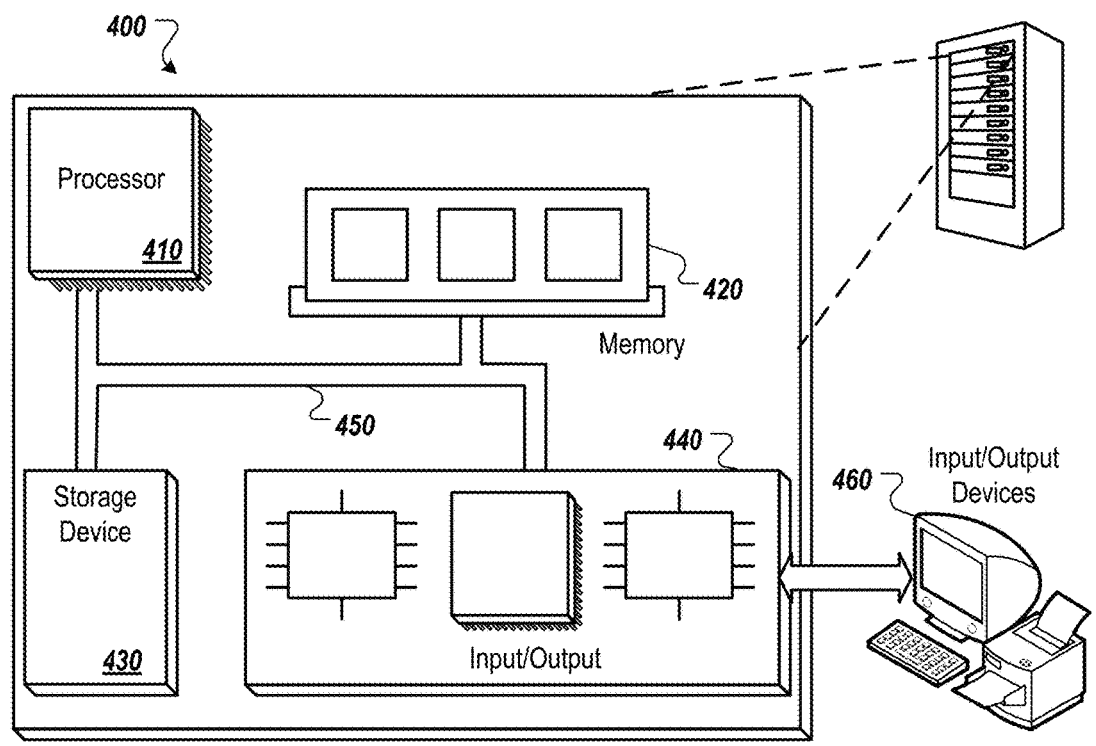
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method performed by one or more data processing apparatus, the method comprising:
   receiving, by one or more data processing apparatus, a request submitted by a client mobile device for a content item to be stored for presentation with offline content of a first application when the client mobile device is offline;
   generating and transmitting data to the client mobile device, responsive to receiving the request, that causes the client mobile device to store the content item for presentation with the offline content of the first application when the client mobile device is offline;
   determining, by the one or more data processing apparatus, that a second application is installed on the client mobile device that can display content items in a file format of the content item;
   determining that the content item is able to be presented with offline content of the second application when the client mobile device is offline; and
   generating and transmitting analytics instructions, responsive to determining that the content item is able to be presented with offline content of the second application, that cause the client mobile device to:
      detect presentation of the content item with each of the first application and the second application; and
      transmit data specifying the content item was presented with the first application or the second application.

2. The method of claim 1, further comprising selecting the content item based on i) the offline content of the first application and ii) profile data, wherein the profile data includes data specifying activities performed at the client mobile device.

3. The method of claim 1, further comprising transmitting data that notifies the client mobile device that the content item is able to be presented with the offline content of the second application when the client mobile device is offline.

4. The method of claim 1, wherein determining that the second application is installed on the client mobile device further comprises receiving, by the one or more data processing apparatus, a call submitted by the client mobile device to determine whether the content item is able to be presented with the offline content of the second application when the client mobile device is offline, the call including i) data associated with the content item and ii) data associated with the second application.

5. The method of claim 1, wherein generating the analytics instructions comprises generating analytics instructions that cause the client mobile device to provide billing identification information associated with the i) content item and ii) the second application in response to user presentation of the content item with the second application.

6. The method of claim 1, further comprising:
   determining that the content item is unable to be presented with a third application that is installed on the client mobile device; and
   in response to determining that the content item is unable to be presented with the third application, providing, to the client mobile device, incompatibility data specifying that the content item is unable to be presented with the third application.

7. The method of claim 6, wherein determining that the content item is unable to be presented with the third application that is installed on the client mobile device further comprises determining that the content item is in a file format that is not supported by the third application.

8. The method of claim 6, further comprising:
   after providing the incompatibility data to the client mobile device, receiving an additional request for an additional content item to be presented with the third application when the client mobile device is offline.

9. The method of claim 1, further comprising selecting the content item based on a categorization of the first application.

10. The method of claim 1, wherein determining that the content item is able to be presented with offline content of the second application when the client mobile device is offline further comprises:

comparing one or more first parameters associated with the content item with one or more second parameters associated with the second application;

determining that at least one of the first parameters and one of the second parameters have a similarity greater than a threshold; and in response to determining that at least one of the first parameters and one of the second parameters have a similarity greater than a threshold, determining that the content item is able to be presented with the offline content of the second application when the client mobile device is offline.

11. A non-transitory computer storage medium encoded with a computer program, the program comprising instructions that when executed by one or more data processing apparatus cause the one or more data processing apparatus to perform operations comprising:

receiving, by the one or more data processing apparatus, a request submitted by a client mobile device for a content item to be stored for presentation with offline content of a first application when the client mobile device is offline;

generating and transmitting data to the client mobile device, responsive to receiving the request, that causes the client mobile device to store the content item for presentation with the offline content of the first application when the client mobile device is offline;

determining, by the one or more data processing apparatus, that a second application is installed on the client mobile device that can display content items in a file format of the content item;

determining that the content item is able to be presented with offline content of the second application when the client mobile device is offline; and generating and transmitting analytics instructions, responsive to determining that the content item is able to be presented with offline content of the second application, that cause the client mobile device to:

detect presentation of the content item with each of the first application and the second application; and transmit data specifying the content item was presented with the first application or the second application.

12. The computer storage medium of claim 11, the operations further comprising selecting the content item based on i) the offline content of the first application and ii) profile data, wherein the profile data includes data specifying activities performed at the client mobile device.

13. The computer storage medium of claim 11, the operations further comprising transmitting data that notifies the client mobile device that the content item is able to be presented with the offline content of the second application when the client mobile device is offline.

14. The computer storage medium of claim 11, wherein determining that the second application is installed on the client mobile device further comprises receiving, by the one or more data processing apparatus, a call submitted by the client mobile device to determine whether the content item is able to be presented with the offline content of the second application when the client mobile device is offline, the call including i) data associated with the content item and ii) data associated with the second application.

15. The computer storage medium of claim 11, wherein generating the analytics instructions comprises generating analytics instructions that cause the client mobile device to provide billing identification information associated with the i) content item and ii) the second application in response to user presentation of the content item with the second application.

16. The computer storage medium of claim 11, the operations further comprising:

determining that the content item is unable to be presented with a third application that is installed on the client mobile device; and in response to determining that the content item is unable to be presented with the third application, providing, to the client mobile device, incompatibility data specifying that the content item is unable to be presented with the third application.

17. The computer storage medium of claim 16, the operations further comprising:

after providing the incompatibility data to the client mobile device, receiving an additional request for an additional content item to be presented with the third application when the client mobile device is offline.

18. A system comprising:

one or more data processing apparatus that interact with the data store and execute instructions that cause the one or more data processing apparatus to perform operations including:

receiving, by one or more data processing apparatus, a request submitted by a client mobile device for a content item to be stored for presentation with offline content of a first application when the client mobile device is offline;

generating and transmitting data to the client mobile device, responsive to receiving the request, that causes the client mobile device to store the content item for presentation with the offline content of the first application when the client mobile device is offline;

determining, by the one or more data processing apparatus, that a second application is installed on the client mobile device that can display content items in a file format of the content item;

determining that the content item is able to be presented with offline content of the second application when the client mobile device is offline; and generating and transmitting analytics instructions, responsive to determining that the content item is able to be presented with offline content of the second application, that cause the client mobile device to:

detect presentation of the content item with each of the first application and the second application; and transmit data specifying the content item was presented with the first application or the second application.

19. The system of claim 18, the operations further comprising transmitting data that notifies the client mobile device that the content item is able to be presented with the offline content of the second application when the client mobile device is offline.

20. The system of claim 18, wherein determining that the second application is installed on the client mobile device further comprises receiving, by the one or more data processing apparatus, a call submitted by the client mobile device to determine whether the content item is able to be presented with the offline content of the second application when the client mobile device is offline, the call including i) data associated with the content item and ii) data associated with the second application.

* * * * *